July 23, 1946.  G. POTAPENKO  2,404,527

ELECTRIC DISTANCE METER

Filed May 2, 1939

INVENTOR,
Gennady Potapenko,
BY Russell M. Otis
ATTORNEY.

Patented July 23, 1946

2,404,527

UNITED STATES PATENT OFFICE 2,404,527

ELECTRIC DISTANCE METER

Gennady Potapenko, Pasadena, Calif.

Application May 2, 1939, Serial No. 271,300

7 Claims. (Cl. 250—1)

My invention relates to an electric distance meter for measuring the distance between the measuring apparatus and a surface capable of reflecting electromagnetic radiation of suitable frequency. The invention has a particularly valuable application to the problem of determining, while in an aircraft, the height of the aircraft above the surface of the earth.

An object of the invention is to provide a method and an apparatus for measuring the distance between the measuring apparatus and a surface capable of reflecting electromagnetic radiation of suitable frequency.

Another object is to provide a method and an apparatus for measuring elevation above the surface of the earth.

Another object is to provide an apparatus which measures an electrical quantity in the time interval between the sending of a pulse of electromagnetic radiation and its return from a reflecting surface.

Another object of the invention is to provide a method and apparatus for measuring the distance to a surface, in which an electrical measuring instrument is started by an electric pulse coinciding with a transmitted pulse of radio waves and is stopped by an electric pulse coinciding with a reflected pulse of radio waves.

Another object is to provide a method and apparatus for measuring one of two electric pulses only during that portion thereof when the other of said pulses is of substantially zero amplitude.

A further object is to provide a method and apparatus for producing and measuring an electric current proportional to the time interval between arrival of two electric pulses and independent of the maximum amplitude of the pulses.

Still another object of the invention is to provide an electric distance meter which is accurate and dependable and requires a minimum of attention to operate it.

These and other apparent objects I attain in a manner which will be clear from a consideration of the following description taken in connection with the accompanying drawing, in which.

In the practice of my invention, pulses of electromagnetic radiation are transmitted to the surface, the distance of which is to be determined, and the pulses of electromagnetic radiation are received after having been reflected from the surface. A measurement of an electric current or potential difference derived from the source of transmitted radiation, or from a separate source, is preferably made in the interval between transmitted and received pulses by initiating the measurement by one pulse and counteracting with the second pulse the action of the first pulse. Since electromagnetic radiation travels with the substantially constant velocity of approximately $3 \times 10^8$ meters per second, the duration of the measurement is an accurate measure of the distance travelled by the electromagnetic radiation, which is substantially twice the distance from the source of radiation to the reflecting surface.

The method and apparatus of my invention should be distinguished from those previously employed for the measurement of distance by means of radio waves. Other methods have either measured the elapsed time between transmission and reception of the waves directly by means of a cathode beam tube or have modulated the transmitter frequency linearly and have determined by a beat method the difference in frequency between waves being received and those being transmitted. The latter method is described in an article by S. Matsuo, Proc. I. R. E., vol. 26, p. 848. The apparatus of these methods is bulky and requires considerable attention on the part of an operator. The apparatus of my invention, on the other hand, is relatively light, is easy to operate, and requires no attention other than to read the numerical registration of distance given on an electrical instrument.

The present embodiment of my invention is particularly adapted to the determination of the altitude of aircraft relative to the earth's surface, and my invention will be explained in connection with this use; but it will be understood that my invention may also be employed in measuring the distances to surfaces other than the surface of the earth.

Figure 2:
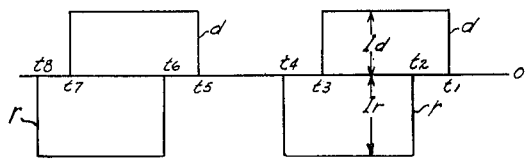
Fig. 2 illustrates the relations existing between two electric pulses existing in the circuit of Fig. 1 for one particular condition.

In the disclosed embodiment of my invention, I provide a short wave radio transmitter 10, preferably adapted to generate alternating current of a frequency between $10^8$ and $10^9$ cycles per second. The transmitter is keyed by means of a keying device generally designated by the numeral 11 to produce a series of pulses of high frequency alternating potential difference between the conductors 12 and 13. For the sake of diagrammatic illustration, the keying device 11 is shown as a relay 14, the switch of which is inserted in the conductor 12, and the coil of which is energized by a pulse generator 15 of construction well known in the art. The pulse generator 15 generates pulses of electric current which occur at regular intervals. The switch of relay 14 closes at the beginning of each pulse, conducts the radio-frequency current from the transmitter 10 to the conductor 12, and opens at the end of the pulse. The conductors 12 and 13, therefore, have imposed a radio-frequency potential difference which appears at the beginning of a pulse, continues at substantially constant amplitude during the pulse, and disappears at the end of the pulse. Preferably the frequency of the pulses is from $10^3$ to $10^4$ per second, although this depends upon the desired range of the distance meter, as hereinafter explained. It will be seen, then, that within a single pulse, as it exists at conductors 12 and 13, there are many radio-frequency cycles, and since during a pulse the amplitude of the radio-frequency variation is preferably substantially the same in each cycle, a plot of the amplitude of the radio-frequency potential difference against time would be rectangular in shape and appear similar to the rectangles $d$ in Fig. 2. While pulses of rectangular shape are shown, it will be understood that pulses of various other suitable shapes may be employed, if desired.

Figure 1:
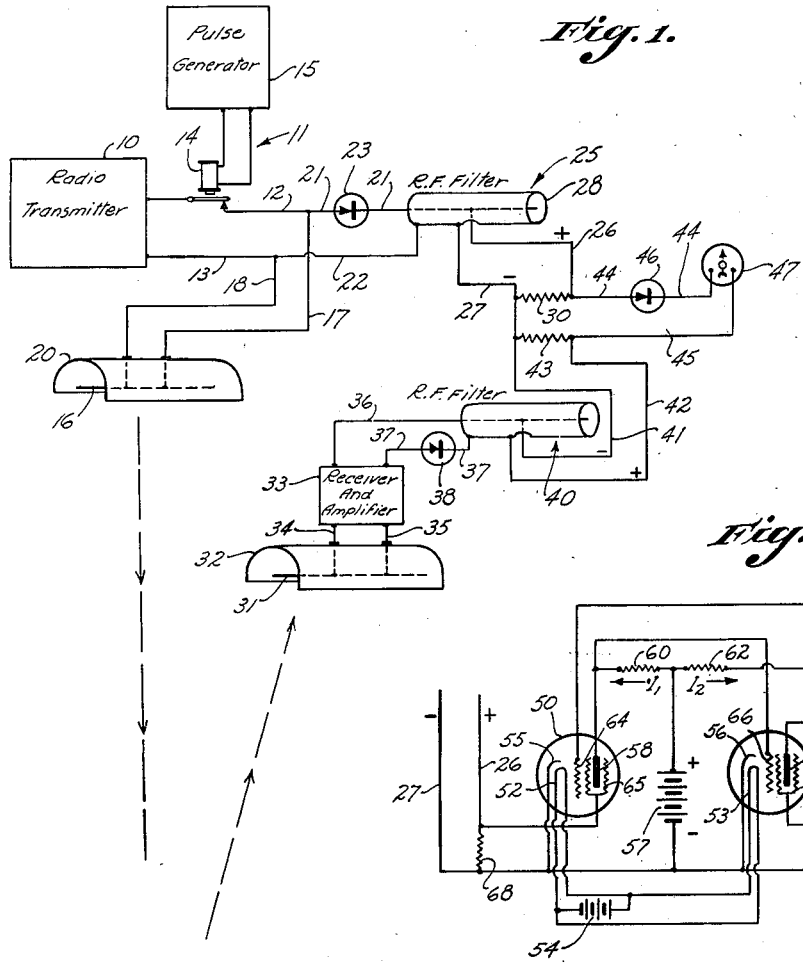
Fig. 1 is a diagrammatic illustration of one form of my electric distance meter.

It will be understood that the keying device 11 is shown as illustrated in Fig. 1 purely for the sake of simplicity. A switch in the conductor 12 or within the transmitter 10 may, if desired, be operated by a mechanical device adapted to open and close it at predetermined intervals. Or any one of the keying devices well-known in the art may be employed to open and close the circuit from the transmitter or to provide "on" and "off" periods of the current from the transmitter at predetermined intervals. The transmitter may, if desired, be modulated in a well-known manner by means of electronic devices to effect this result.

A directional transmitting antenna 16 is connected by means of conductors 17 and 18 to the conductors 12 and 13, respectively, the antenna being connected with the conductors in a manner well-known in the art to provide efficient directional transmission of short-wave radio waves therefrom. While various arrangements known in the art may be employed to provide directional transmission, a parabolic reflector 20 is shown herein for that purpose.

Conductors 21 and 22 form continuations of the conductors 12 and 13, respectively. In series with the conductor 21 is placed a rectifier 23 which may, for example, permit current to pass along the conductor 21 away from the conductor 12. Instead of the half-wave rectifier shown, I may, if desired, employed a full-wave rectifier. A filter 25 is connected between the incoming conductors 21 and 22 and outgoing conductors 26 and 27, and is adapted to filter out substantially all of the radio-frequency component of the rectified current through conductors 21 and 22, leaving in conductors 26 and 27 substantially only pulses of continuous direct current, of substantially rectangular wave shape, designated by $d$ in Fig. 2. The filter 25 is preferably of the concentric line type such, for instance, as that described in an article by Leeds, Proceedings of the Institute of Radio Engineers, vol. 26. pp. 576–589. A filter of this type comprises a cylinder 28 concentric with the incoming line 21 and preferably of a length equal to one-half wave length of the radio-frequency current desired to be filtered out. The incoming conductor 22 and the outgoing conductor 27 are both connected to the cylinder 28 and the outgoing conductor 26 is connected to the conductor 21 at a point midway between the ends of the cylinders 28 and passes out through a hole in the cylinder. Cylinders of other lengths may, if desired, be employed and suitable connections be made thereto to effect the same result, all as described in the above-mentioned article. Filters of this type are considered more desirable for very high frequencies than filters with lumped capacity and inductance. In the embodiment illustrated in Fig. 1, a resistance 30 is connected between the conductors 26 and 27.

A directional receiving antenna 31, which may be provided with a parabolic reflector 32 to give it directional properties, is connected to a receiver and radio-frequency amplifier 33 through conductors 34 and 35. Conductors 36 and 37 are connected to the outgoing side of the receiver 33. In series with the conductor 37 is placed the rectifier 38 which may be of either the half-wave or full-wave type and is adapted to pass current away from the receiver 33; and between the conductors 36 and 37, beyond the rectifier, is preferably connected a filter 40, preferably of the concentric line type, which is similar to the filter 25 and is adapted to filter out the radio-frequency component of the current in the conductors 36 and 37, leaving in the outgoing conductors 41 and 42 substantially only pulses of continuous direct current of substantially rectangular wave shape, designated by the letter $r$ in Fig. 2. In the embodiment of Fig. 1, a resistance 43 is connected between the conductors 41 and 42 and the conductors 27 and 41 are connected together.

In the embodiment of Fig. 1, conductors 44 and 45 are connected, respectively, to the conductors 26 and 42. A rectifier 46 is connected in series with the conductor 44 and is adapted to pass current away from the conductor 26. An electric measuring instrument 47 preferably of relatively high resistance compared to the resistances 30 and 43, and preferably of ballistic character, is connected between the conductors 44 and 45 beyond the rectifier 46, and is adapted to measure the average current in the conductors 44 and 45 or the average potential difference therebetween. When the conductor 42 is positive with respect to the conductor 26 current is prevented by the rectifier 46 from passing through the instrument 47, and it is only when the conductor 26 is more positive than the conductor 42 that the instrument 47 is operative. It is understood that various bridge circuits and other connections of the electrical measuring instrument may be made to accomplish similar results.

As employed on an airplane to measure the elevation of the airplane above the surface of the earth, the antenna 16 is preferably located under one wing with the reflector 20 positioned so as to direct the radiation downwardly. The antenna 31 is preferably located under the other wing on the opposite side of the fuselage from the antenna 16 so as to minimize direct reception by the antenna 31 of the radiation from the antenna 16, and the reflector 32 is so positioned as to cause the antenna 31 to receive radiation predominantly coming from below. It will be understood, however, that any other suitable arrangement of the antenna may be employed.

In operation, the conductors 17, 18 and 21, 22 are subjected to pulses of high frequency electromotive force. At the time $t_1$, in Fig. 2, a pulse may begin and may continue until a later time $t_3$. During this interval a high frequency electromotive force is impressed upon the conductors 17 and 18 and also upon the conductors 21 and 22. During this interval, therefore, high frequency radio waves are radiated from the antenna 16 toward the earth. In the interval between the times $t_3$ and $t_5$ no potential difference exists between the conductors 17 and 18 or between the conductors 21 and 22. Between the times $t_5$ and $t_7$ another pulse of radio-frequency electromotive force is impressed upon the conductors 17, 18 and upon the conductors 21, 22.

During the pulses between times $t_1$ to $t_3$ and $t_5$ to $t_7$ the radio-frequency potential difference between the conductors 21 and 22 is rectified by the rectifier 23 and varying direct current tends to flow through the filter 25 and the resistance 30. The filter 25 removes substantially all of the high frequency component of the current in the circuit, leaving substantially a continuous direct current which varies similarly to the rectangle $d$ in Fig. 2.

The radio-frequency waves radiated from the antenna 16 pass downwardly to the earth's surface from which they are reflected upwardly and are received on the antenna 31 at a time following their radiation from the antenna 16 by an interval depending upon the distance traveled by the waves. The airplane makes very little progress in the short interval between radiation and reception of the waves and the elapsed time in seconds is substantially equal to two times the elevation in meters of the airplane above the surface of the earth divided by $3 \times 10^8$, the velocity of light in meters per second. The radio-frequency waves impinging upon the antenna 31 are translated by the receiver and amplifier 33 into a radio-frequency potential difference across the conductors 36 and 37 which is rectified by the rectifier 38 and tends to produce a varying direct current through the filter 40 and the resistance 43. The filter 40 removes substantially all of the radio-frequency component and leaves a continuous direct current of amplitude $I_r$ through the resistance 43 which varies similarly to the rectangle $r$ in Fig. 2. Since the effect of the current $I_r$ in the measuring circuit is opposed to that of the current $I_d$, the current $I_r$ is, for illustrative purposes, shown on the opposite side of the O line in the chart of Fig. 2. The amplification of the amplifier 33 is preferably adjusted so that the potential difference across the resistance 43 due to the passage of the current $I_r$ therethrough is greater than the potential difference across the resistance 30 due to the passage of the current $I_d$ therethrough. It will be understood that it is not necessary that the resistances 30 and 43 be of the same value but it is assumed here that this condition exists so that the potential differences across the respective resistances are proportional to the currents flowing therethrough.

For a particular elevation of the airplane above the earth's surface, the interval of time elapsing between the radiation and reception of a pulse may be $t_1t_2$. The pulse $d$ of current $I_d$ through resistance 30 will, then, start at the time $t_1$ while the pulse $r$ of current $I_r$ through the resistance 43 will not start until the time $t_2$, and whereas the pulse $d$ will end at $t_3$ the pulse $r$ will not end until $t_4$, the interval $t_1t_2$ being equal to the interval $t_3t_4$. Likewise, the next pulse $r$ will start at time $t_6$ and end at time $t_8$ where the intervals $t_5t_6$ and $t_7t_8$ are both equal to the intervals $t_1t_2$ and $t_3t_4$.

During the time interval $t_1t_2$ a potential difference exists across the resistance 30 proportional to the current $I_d$ and substantially no potential difference exists across the resistance 43. The conductor 26 is therefore positive with respect to the conductor 42 and a potential difference exists across the instrument 47 proportional to the current $I_d$. In the interval $t_2t_3$ the current $I_r$ through the resistance 43 counteracts the effect of the current $I_d$ through the resistance 30 and there exists a potential difference between the conductors 42 and 26 proportional to the difference $I_s$ between $I_r$ and $I_d$, with the conductor 42 positive with respect to the conductor 26. Since, under these conditions, the rectifier 46 does not permit any current to pass, there is no potential difference across the instrument 47 during the interval $t_2t_3$. During the interval $t_3t_4$ no potential difference exists across the resistance 30 and a potential difference exists across the resistance 43 proportional to the current $I_r$, the conductor 42 being positive with respect to the conductor 26. No potential difference, therefore, exists across the instrument 47 during the period $t_3t_4$. During the period $t_4t_5$ no current flows through either of the resistances 30 and 43 and no potential difference exists across the instrument 47. Upon the start of another pulse the instrument again registers a potential difference proportional to $I_d$ during the interval $t_5t_6$ and is idle until the succeeding pulse $d$ occurs.

Figure 3:
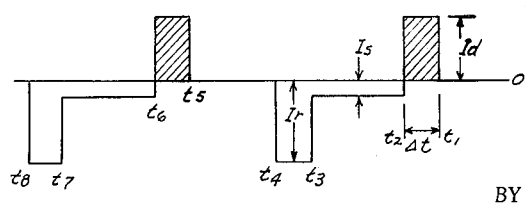
Fig. 3 illustrates the resultant of the pulses of Fig. 2 and that portion thereof which is measured.

In Fig. 3 is plotted the potential difference between the conductors 26 and 42, with those intervals during which measurement takes place being cross-hatched. For a given frequency of pulses it will be evident that, since the value of $I_d$ is constant, the reading of the instrument 47 will be proportional to $I_d \times \Delta t$ where $\Delta t$ equals the time between $t_1$ and $t_2$. As previously explained, the time interval $\Delta t$ required for the radiation to travel to the earth's surface and back is proportional to the elevation H of the airplane above the surface of the earth. It will be evident then that the reading of the instrument 47 will be proportional to $I_d \times H$. The instrument 47 may, therefore, be calibrated directly in terms of H.

It is important that the duration $t_1t_3$ of each pulse be at least as long as the interval $t_1t_2$ corresponding to the greatest distance desired to be measured, and that the interval $t_3t_5$ be at least as long as the interval $t_1t_3$. Preferably the interval $t_3t_5$ is made equal to that of $t_1t_3$ and the duration $t_1t_3$ of the pulse is varied by varying the pulse frequency. The invention contemplates the possibility of supplying any of several different pulse frequencies and of operating at that frequency best suited to the distance range in which one is interested. The instrument 47, of course, requires a separate calibration for each pulse frequency employed.

Due to direct coupling between the transmitting and receiving antennas it may be that a small current will flow through the resistance 43 coincidentally with the passage of the current $I_d$ through the resistance 30, but since it will start and stop at the same times as the current $I_d$ it will be evident that the only effect will be to counteract some of the current $I_d$. Since the amplitude of this current due to direct coupling is constant, its effect upon the reading of the instrument 47 will be taken account of in calibration of the instrument.

Figure 4:
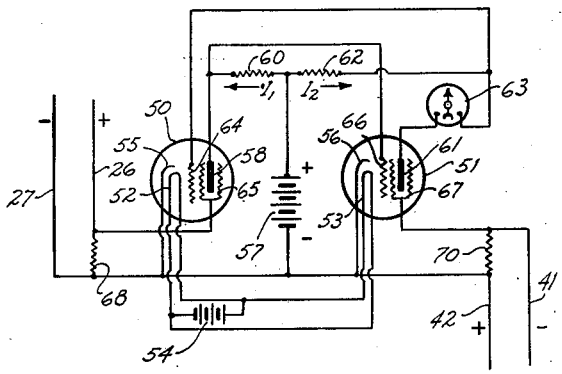
Fig. 4 shows an alternative form of a portion of the circuit of Fig. 1.

An alternative form of measuring circuit is illustrated in Fig. 4. Two vacuum tubes 50 and 51, each with two grids, are preferably employed. Heaters 52 and 53 of the tubes 50 and 51, respectively, are connected in parallel and are supplied by a battery 54. The cathodes 55 and 56 of the tubes 50 and 51, respectively, are connected together and to the negative side of a battery 57 and to the conductor 27 and 42. The anode 58 of the tube 50 is connected to the positive side of the battery 57 through a resistance 60, and the anode 61 of the tube 51 is preferably connected to the positive side of the battery 57 through a resistance 62 and a current measuring instrument 63. One of the grids 64 of the tube 50 is connected to a point between the resistance 62 and the meter 63 while the other of the grids 65 is connected to the conductor 26. One of the grids 66 of the tube 51 is connected to the anode 58 and the other of the grids 67 is connected to the conductor 41. A resistance 68 is preferably connected between the conductors 26 and 27 and another resistance 70 is preferably connected between the conductors 41 and 42.

The passage of plate current $I_1$ through the resistance 60 places a negative bias on the grid 66 of tube 51 and the passage of plate current $I_2$ through the resistance 62 places a negative bias on the grid 64 of the tube 50. The resistances 60 and 62 and the voltage of the battery 57 are made such that the biases resulting from passage of the currents $I_1$ and $I_2$ are beyond the cut-off points of the tubes 51 and 50. The resistances 68 and 70 are of such values that when the currents $I_d$ and $I_r$, respectively, pass through them, the negative biases produced on the grids 65 and 67 are sufficient to reduce the currents in the respective tubes to substantially zero.

The operation of the circuit is, then, as follows. Assume that in the interval prior to $t_1$ the tube 50 is conducting and plate current $I_1$ is flowing. The grid 66 is biased beyond cut-off and no current flows through the meter 63. At time $t_1$ the current $I_d$ starts to flow through the resistance 68, the grid 65 is biased beyond cut-off, and the current $I_1$ ceases to flow. The bias on grid 66 then no longer exists and the tube 51 immediately becomes conducting, the current $I_2$ passing through the meter 63 and the resistance 62. The passage of the current $I_2$ still further biases the grid 64 of the tube 50. The current $I_2$ continues to flow until time $t_2$ when the passage of current $I_r$ through the resistance 70 biases the grid 67 to such an extent that the current $I_2$ is stopped. During the interval $t_2t_3$ both tubes are non-conducting. At the time $t_3$ the bias on the grid 65 is removed due to stopping of the current $I_d$ and the current $I_1$ starts flowing, biasing the grid 66. When the bias on the grid 67 is removed at $t_4$ due to stopping of the current $I_r$ the bias on the grid 66 still prevents current from flowing through the meter 63 and the tube 51. The current $I_1$ continues to flow through the tube 50 until another pulse starts at $t_5$ and the entire cycle is repeated. It will be seen that current flows through the meter 63 only during the time intervals $t_1t_2$, $t_5t_6$, etc. Since the current which flows is constant while it flows and is independent of the intensity of the radiation received on the antenna 31, the reading of the meter 63 will vary only with the length of the time interval $\Delta t$, which is proportional to the height of the apparatus above the surface of the earth.

The circuit of Fig. 4 has only ohmic resistances and inter-electrode capacities which are small. The time constants of various parts of the circuit are therefore very small, and by proper choice of tubes, resistances, and batteries it is possible to make the circuit operate at extremely high speed so that the time interval $t_1t_2$ can still be recognized even though it is only of the order of a small fraction of 1 microsecond. When the circuit of Fig. 4 is employed the filters 25 and 40 may be eliminated, if desired. While I have, in Fig. 4, shown a particular circuit and tubes with two grids it will be understood that the same principles may be applied to provide other vacuum tube relay circuits employing tubes as described or tubes of other well-known types.

When a vacuum tube relay circuit such as that of Fig. 4 is employed the pulse duration $t_1t_3$ may be made as short as desired so long as it is long enough to operate the relay. With this circuit it is not necessary that the interval $t_1t_3$ be as long as $t_1t_2$. This will be evident from the fact that current $I_2$ starts to flow at time $t_1$ and will, by reason of the resulting bias on the grid 64, continue to flow even if current $I_d$ stops flowing and the bias on grid 65 is removed. The current $I_2$ will continue to flow until pulse $r$ arrives at the time $t_2$. It is still necessary, however, for the interval $t_3t_5$ between pulses to be equal to or greater than the interval $\Delta t$ corresponding to the greatest distance desired to be measured. One possible arrangement is to make the intervals $t_1t_3$, $t_5t_7$, etc., always substantially equal to the interval $\Delta t$. This result may be automatically secured by arranging the transmitter keying relay to be operated by the pulse generator to key the transmitter "on" and to be energized by the potential difference between the conductors 41 and 42 to key the transmitter "off" when the pulse $r$ arrives at $t_2$. But, in practice, it is preferable to operate the apparatus, as previously described, wherein the intervals $t_1t_3$, $t_5t_7$, etc., are independent of $\Delta t$ and the effect of the pulse coinciding with the transmitted pulse is counteracted by the pulse coinciding with the pulse received after reflection, the counteraction being effected in a circuit totally separated from the keying relay, as shown in Figs. 1 and 4. Under such circumstances, the keying of the transmitter and the load on it are independent of the operation of the rest of the apparatus and the stability of the transmitter is more easily maintained.

It will be seen that the apparatus disclosed is adapted to function within wide limits of the intensity of the radiation received after having been reflected from the distant surface, for the operation of my apparatus depends not upon the intensity of the received radiation but upon its time of arrival relative to the time when it was sent. Another great advantage of my apparatus is that a definite numerical registration of distance is continuously given without the necessity of any setting or adjustment operation to obtain the measurement.

It will be understood that various changes and modifications in the apparatus disclosed may be made by those skilled in the art without departing from the spirit and scope of the invention as defined in the appended claims.

I claim as my invention:

1. Distance measuring apparatus, comprising: an antenna adapted to radiate toward a surface; means including a radio transmitter adapted to periodically energize said antenna, whereby pulses of radio waves are radiated toward said surface; an electric circuit energized by said transmitter coincidentally with said antenna; a rectifier in said circuit, and a filter in said circuit for filtering out radio-frequency components of the current in said circuit, whereby pulses of continuous direct current corresponding substantially in time with said transmitted pulses pass through said electric circuit; means including an antenna and a radio-frequency amplifier for receiving said pulses of radio waves after having been reflected from said surface; a second electric circuit connected to said receiving means; a rectifier in said second circuit, and a filter in said second circuit for filtering out radio-frequency components of the current in said second circuit, whereby pulses of continuous direct current corresponding substantially in time with said received pulses pass through said second circuit; an electrical measuring instrument; and an electric circuit connected with said instrument and with said first and second circuits and adapted to energize said instrument substantially only in response to a pulse passing in said first circuit corresponding substantially in time with one of said transmitted pulses and in the absence of any pulse passing in said second circuit corresponding in time with a received pulse.

2. Distance measuring apparatus, comprising: an antenna adapted to radiate toward a surface; means including a radio transmitter adapted to periodically energize said antenna, whereby pulses of radio waves are radiated toward said surface; an electric circuit energized by said transmitter coincidentally with said antenna; a rectifier in said electric circuit, and a filter in said electric circuit for filtering out radio-frequency components of the current in said circuit, whereby pulses of continuous direct current corresponding substantially in time with said transmitted pulses pass through said electric circuit; means including an antenna and a radio-frequency amplifier for receiving said pulses of radio waves after having been reflected from said surface; a second electric circuit connected to said receiving means; a rectifier in said second electric circuit, and a filter in said second electric circuit for filtering out radio-frequency components of the current in said circuit, whereby pulses of continuous direct current corresponding substantially in time with said received pulses pass through said second circuit; and an electric circuit connected to said first and second circuits and including electrical measuring means responsive to said pulses of direct current in one of said circuits during the periods when said pulses of direct current in the other of said circuits are not passing therethrough.

3. Distance measuring apparatus, comprising: an antenna adapted to radiate toward a surface; means including a radio transmitter adapted to periodically energize said antenna, whereby pulses of radio waves are radiated toward said surface; an electric circuit energized by said transmitter coincidentally with said antenna; a rectifier in said electric circuit, and a filter in said electric circuit for filtering out radio-frequency components of the current in said circuit, whereby pulses of continuous direct current corresponding substantially in time with said transmitted pulses pass through said electric circuit; means including an antenna and a radio-frequency amplifier for receiving said pulses of radio waves after having been reflected from said surface; a second electric circuit connected to said receiving means; a rectifier in said second electric circuit, and a filter in said second electric circuit for filtering out radio-frequency components of the current in said circuit, whereby pulses of continuous direct current corresponding substantially in time with said received pulses pass through said second circuit, said receiving means being so adjusted that said direct current pulses in said second circuit are of greater amplitude than said direct current pulses in said first circuit; and an electric circuit connected to said first and second circuits and including measuring means responsive to the current in said first circuit when it is greater than the current in said second circuit.

4. Distance measuring apparatus, comprising: an antenna adapted to radiate toward a surface; means including a radio transmitter adapted to periodically energize said antenna, whereby pulses of radio waves are radiated toward said surface; an electric circuit energized by said transmitter coincidentally with said antenna; a rectifier in said electric circuit, whereby pulses of direct current corresponding substantially in time with said transmitted pulses pass through said circuit; means including an antenna and a radio-frequency amplifier for receiving said pulses of radio waves after having been reflected from said surface; a second electric circuit connected to said receiving means; a rectifier in said second electric circuit, whereby pulses of direct current corresponding substantially in time with said received pulses pass through said second circuit; a filter in each of said circuits for filtering out the radio-frequency components of the currents in said circuits; and an electric circuit connected to said first and second circuits and including measuring means responsive to the current in said first circuit when it is greater than the current in said second circuit.

5. Distance measuring apparatus, comprising: an antenna adapted to radiate toward a surface; means including a radio transmitter adapted to periodically energize said antenna, whereby pulses of radio waves are radiated toward said surface; means including an antenna and a radio-frequency amplifier for receiving said pulses of radio waves after having been reflected from said surface; an electric circuit energized by said transmitter coincidentally with said antenna; a second electric circuit connected to said receiving means; a rectifier in each of said circuits, whereby pulses of direct current corresponding in time substantially with said transmitted and said reflected pulses pass respectively through said first and said second circuits; an electrical measuring instrument; and means in connection with said instrument and with said first and second circuits for starting a predetermined current through said instrument at the start of each pulse in said first circuit and for stopping said current at the start of each pulse in said second circuit.

6. Distance measuring apparatus, comprising: means for transmitting pulses of electromagnetic radiation to a surface; means including an electric circuit associated with said transmitting means for producing continuous direct current pulses in said circuit substantially coinciding in time with said transmitted pulses of electromagnetic radiation; means for receiving said pulses of electromagnetic radiation after having been reflected from said surface; means including a second electric circuit for translating said received pulses into continuous direct current pulses in said second circuit substantially coinciding in time with said received pulses; an electrical measuring instrument; and means including an electric circuit connected with said instrument and with said first and second circuits and responsive to the direct current pulses in said first and second circuits for energizing said instrument only during time intervals determined by the time lag between the direct current pulses in said first circuit and the direct current pulses in said second circuit.

7. Distance measuring apparatus, comprising: means for transmitting pulses of electromagnetic radiation to a surface; means including an electric circuit associated with said transmitting means for producing continuous direct current pulses in said circuit substantially coinciding in time with said transmitted pulses of electromagnetic radiation; means for receiving said pulses of electromagnetic radiation after having been reflected from said surface; means including a second electric circuit for translating said received pulses into continuous direct current pulses in said second circuit substantially coinciding in time with said received pulses; and means, including an electrical measuring instrument and an electric circuit connected with said instrument and with said first and second circuits, for measuring the time lag between said direct current pulses in said first circuit and said direct current pulses in said second circuit.

GENNADY POTAPENKO.